United States Patent Office 3,321,512
Patented May 23, 1967

3,321,512
MANUFACTURE OF PERBENZOIC ACIDS
David James Cooper and Tony Nicholas Gibson, both of Whitley Bay, Northumberland, England, assignors to The Procter & Gamble Company, Cincinnati, Ohio, a corporation of Ohio
No Drawing. Filed Jan. 22, 1964, Ser. No. 339,323
Claims priority, application Great Britain, Jan. 31, 1963, 4,012/63
2 Claims. (Cl. 260—502)

This invention relates to an improved process for the manufacture of perbenzoic acids.

The conventional method of preparing aromatic percarboxylic acids is a two stage process in which the diacyl peroxide is prepared by reacting the aromatic acyl chloride (e.g., benzoyl chloride) with alkaline hydrogen peroxide, and the diacyl peroxide (e.g., benzoyl peroxide) which is obtained is then treated with sodium methoxide to produce an equimolecular mixture of the percarboxylic acid salt and the methyl ester of the carboxylic acid.

$2RCO.Cl + 2NaOH + H_2O_2$
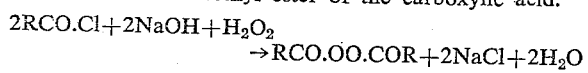
$RCO.OO.COR + NaOCH_3 \rightarrow RCO.OONa + RCO.OCH_3$ where R is an aromatic radical such as a phenyl radical.

This method has a considerable disadvantage in that only one-half of the original acyl chloride is converted to the percarboxylic acid.

Attempts have been made to carry out the process as a single stage reaction in which all the acyl chloride reacts to form percarboxylic acid. Because the diacyl peroxide is an inevitable intermediate product in the reaction and because the diacyl peroxide is insoluble in water, these attempts have involved the use of organic solvents for the diacyl peroxide. For example, it has been proposed to add aromatic acyl chloride to a suspension of sodium peroxide in tetrahydrofuran, a small quantity of water being introduced to initiate the reaction.

The use of organic solvents on a commercial scale has considerable disadvantages as they are costly and additional equipment is necessary for handling and recovering the solvents. Also the organic solvents may react at least to some extent with the oxidising agents used in the reaction with the production of undesirable by-products.

It has now been discovered that substituted or unsubstituted benzoyl peroxide can be converted to the corresponding perbenzoic acid without the use of any organic solvent, if the benzoyl peroxide is suspended in very finely divided form in an aqueous alkaline solution of hydrogen peroxide.

The invention provides a process for the manufacture of substituted or unsubstituted perbenzoic acids which comprises the steps of forming a suspension of finely divided substituted or unsubstituted benzoyl peroxide in an aqueous alkaline solution of hydrogen peroxide having a pH of not less than 10, maintaining the suspension at a pH of not less than 10 for a time sufficient to allow part of the benzoyl peroxide to be converted to a salt of the perbenzoic acid, separating the unreacted benzoyl peroxide from the aqueous solution containing the salt of the perbenzoic acid and then recovering the perbenzoic acid from the aqueous solution.

The perbenzoic acids made by the process of the invention can be unsubstituted or substituted perbenzoic acids, such as chloro- or dichloro-, alkyl- having 1 to 4 carbon atoms, alkoxy- having 1 to 4 carbon atoms, or cyano-perbenzoic acids and especially meta-chloro-perbenzoic acid. These perbenzoic acids are formed from the corresponding benzoyl peroxides.

The suspension of finely divided substituted or unsubstituted benzoyl peroxide in aqueous alkaline hydrogen peroxide can be prepared in any convenient manner. It is preferred, however, to produce the suspension by distributing the corresponding benzoyl chloride in finely divided form in an aqueous alkaline solution of hydrogen peroxide having a pH of not less than 10. The benzoyl chloride reacts with the hydrogen peroxide solution producing the benzoyl peroxide which is obtained in the form of a fine suspension. This can be achieved by introducing the benzoyl chloride at the periphery of a high speed agitator (for example, an agitator of at least 2 inches in diameter rotating at 1500 to 2000 r.p.m.) which is located in the solution. Alternatively, the benzoyl chloride can be introduced into the throat of a Venturi mixer through which the aqueous alkaline solution is passing.

As stated above, the alkaline solution of hydrogen peroxide must have a pH of at least 10. Since the reaction of benzoyl chloride and hydrogen peroxide gives rise to acidity, sufficient alkali must be added either at the beginning of the reaction or during its course to maintain the pH of the suspension at at least 10. Suitable alkaline agents are sodium and potassium hydroxides, oxides and carbonates. Such agents form the sodium and potassium salts of the perbenzoic acid.

When the suspension of the benzoyl peroxide in the aqueous alkaline solution has been formed, it is no longer necessary to maintain violent agitation but the suspension can, if desired, be removed to a reaction zone where the degree of agitation is just sufficient to prevent the suspension settling.

At least 10% excess of hydrogen peroxide should normally be used over the amount stoichiometrically equivalent to the benzoyl chloride and/or benzoyl peroxide to be converted to the perbenzoic acid; for example, 10% to 100% excess is suitable. Use of less excess hydrogen peroxide reduces the speed of reaction; use of greater excess confers little or no benefit. Examination of the reaction has shown that, in the presence of at least 10% excess of hydrogen peroxide, the rate of conversion of the benzoyl peroxide to the perbenzoic acid is determined by the rate of transfer of the benzoyl peroxide from the solid phase to the aqueous phase. It is, therefore, desirable that the benzoyl peroxide should present the greatest possible surface area to the aqueous solution, i.e. the particles should be as small as possible. A suitable range of particle diameters has been found to be from 10 to 50 microns. Smaller sizes are satisfactory but are difficult to achieve in practice.

Since the perbenzoic acid or its salt decompases in alkaline solution, and the rate of decomposition increases with temperature, it is desirable to carry out the reaction at low temperatures, for example, from the freezing point of the aqueous alkaline solution to 75° F., conveniently from 45° to 60° F. For the same reason, it is advantageous to remove the perbenzoic acid or salt from the solution soon after it has been formed. This can be done by separating the unreacted benzoyl peroxide from the solution, for example, by filtering or centrifuging, and returning it for further treatment. The optimum reaction time depends upon the particle size and the properties e.g. solubility of the benzoyl peroxide; usually it is from 1 to 2½ hours. If the reaction time is too long, undue decomposition of the perbenzoic acid takes place; if it is too short, an undesirably large proportion of the benzoyl peroxide is unreacted and must be recycled, and the solution of perbenzoic acid is undesirably dilute.

After separation of the unreacted benzoyl peroxide, the aqueous solution of salt of the perbenzoic acid is acidified to precipitate the perbenzoic acid which can be recovered, for example, by filtering. Since the perbenzoic acid or salt thereof is more rapidly decomposed in mildly alkaline or acid conditions, the solution should be acidified quickly to a pH not exceeding 2, for example, by introducing the alkaline solution into a well stirred bulk of a suspension of the perbenzoic acid, at a pH not exceeding 2. The solution may be acidified by any strong acid compatible with the perbenzoic acid, for example, sulphuric acid.

The decomposition of perbenzoic acid or salt in alkaline solution is catalysed by certain metal ions, notably copper ions. It is, therefore, advantageous to use demineralised water for the process. There are also advantages in including in the system a stabilizer for the perbenzoic salt. A suitable stabilizer is magnesium hydroxide which can be produced in situ by adding a water soluble magnesium salt to the system. The amount of magnesium salt required depends upon the purity of the demineralised water. With very pure water (for example, having a resistivity of 5 megohm centimeters), 1 to 5 parts per million of magnesium based on the water feed can be effective. With less pure water (for example, having a resistivity of less than 0.1 megohm centimeters), up to 30 parts per million of magnesium may be required. Larger quantities are undesirable as they tend to cause excessive blinding or clogging of the filter by which the unreacted benzoyl peroxide is separated. Other stabilisers are sequestering agents, such as the polycarboxylated amines, for example, nitrilotriacetic acid or ethylene diamine tetraacetic acid used in the form of their sodium salts.

The process can be carried out either as a batch process or continuously. The use of a continuous process becomes more desirable as the quantities of the perbenzoic acid to be prepared become greater. In a continuous process demineralised water, excess hydrogen peroxide and caustic soda solution can be fed continuously to a reaction zone and the benzoyl chloride introduced into the reaction zone in such a manner that it is rapidly dispersed in finely divided form throughout the solution of the other reactants. The fine suspension of the benzoyl peroxide in aqueous alkaline hydrogen peroxide solution so obtained is drawn off continuously to a second zone where the degree of agitation is sufficient to maintain the benzoyl peroxide particles in suspension. The second zone can be of such a size that the dwell time of the solution in the zone is, for example, from 1 to 2 hours.

The suspension is drawn off continuously from the second zone at a rate equivalent to the rate of feed of new materials and is passed through a filter, the solid particles being returned to the second zone and the clear liquid from the filter being acidified to precipitate the perbenzoic acid. The precipitated perbenzoic acid is removed in a second filter, washed and dried. The following examples illustrate the invention but do not limit it.

*Example I*

150 lb. per hour of demineralised water, 2.43 lb. per hour of 30% hydrogen peroxide, 3.14 lb. per hour of 46.8% by weight caustic soda solution and a 10% by weight aqueous solution of magnesium nitrate, in amount equivalent to 20 parts per million of magnesium ion by weight based on the water feed, were fed continuously to a water-cooled stainless steel reactor, maintained at 60° F. and fitted with a 3 inch diameter agitator rotated at 1500 revolutions per minute. 3 lb. per hour of meta-chloro-benzoyl chloride were introduced at a point 1/64 inch from the periphery of the agitator. The reaction mixture was maintained at a pH of not less than 10. The reaction mixture overflowed continuously from the reactor to a second stainless steel vessel of 400 lb. capacity which was mildly agitated and was also water-cooled to maintain the temperature at 60° F. The amount of the mixture maintained in the vessel was about 220 lb. From this vessel the resulting suspension of finely divided benzoyl peroxide ranging in particle size from 10 to 50 microns was, after a part of the benzoyl peroxide was converted to a sodium salt of perbenzoic acid, circulated through one side of a continuous filter of 8 micron porosity. Filtrate was withdrawn from the filter at a rate equivalent to the feed rate of new materials and passed through a reaction chamber in which there was a dwell time of 30 minutes to complete the reaction to sodium salt of perbenzoic acid of any benzoyl peroxide which may have passed through the filter. Benzoyl peroxide retained by the filter was washed from the surface and returned to the second reactor. Sulphuric acid was then rapidly added and continuously mixed into the filtrate to give a pH of not more than about 2 and to precipitate meta-chloro-perbenzoic acid which was removed continuously on a drum filter and dried.

The overall conversion of meta-chloro-benzoyl chloride to the perbenzoic acid was 85% and the product obtained had a purity of 85%.

*Example II*

A solution was prepared at 60° F. from 204.3 parts by weight of demineralised water, 2.39 parts by weight of 30% hydrogen peroxide solution, 0.2 part by weight of ethylene diamine tetraacetic acid and sufficient caustic soda to raise the pH to 12.5. 2.2 parts by weight of meta-chloro-benzoyl chloride were added slowly at the periphery of a high speed agitator (2000 r.p.m.) and finely dispersed in the solution. Additional caustic soda was added to maintain the pH at 12.5. The reaction vessel was water-cooled to maintain the temperature at 60° F. When the meta-chloro-benzoyl chloride had been thoroughly dispersed the agitation was slowed so as to maintain the solid particles including a suspension of meta-chloro-benzoyl peroxide particles having a particle size of from 10 to 50 microns, in suspension and the mixture was maintained in this condition for 100 minutes. The mixture was then filtered and the solids comprising meta-chloro-benzoyl peroxide were returned to the next batch. The filtrate was acidified to a pH of not more than about 2 and filtered, and the cake comprising meta-chloro-perbenzoic acid was washed with water and dried.

Overall conversion of meta-chloro-benzoyl chloride to meta-chloro-perbenzoic acid was 93%.

*Example III*

A solution was prepared at 60° F. from 200 parts by weight of demineralised water, 2.66 parts by weight of 30% hydrogen peroxide solution, 0.2 part by weight of ethylene diamine tetraacetic acid and sufficient caustic soda to raise the pH to 11.5. 2.0 parts by weight of p-methoxy-benzoyl chloride were added slowly at the periphery of a high speed agitator (2000 r.p.m.) and finely dispersed in the solution to form a suspension of finely divided p-methoxy-benzoyl peroxide having a particle size of from 10 to 50 microns. Additional caustic soda was added to maintain the pH at 11.5. The reaction vessel was cooled to keep the temperature at 60° F. When the p-methoxy-benzoyl chloride had been thoroughly dispersed the agitation was slowed so as merely to keep the solid particles in suspension and the mixture was maintained in this condition for 100 minutes. The mixture was then filtered and the solids comprising p-methoxy-benzoyl-peroxide returned to the next batch. The filtrate was acidified to a pH of not more than about 2 to precipitate the p-methoxy-perbenzoic acid and filtered, and the cake was washed with a little cold water and dried.

The overall conversion of p-methoxy-benzoyl chloride to p-methoxy-perbenzoic acid was 78%.

When p-methyl-benzoyl chloride or cyano-benzoyl chloride is substituted for the p-methoxy-benzoyl chloride in the above example, similar results are obtained in that p-methyl-perbenzoic acid or cyano-perbenzoic acid is produced.

*Example IV*

A solution was prepared at 60° F. comprising 200 parts by weight of demineralised water, 3.22 parts by weight of 30% hydrogen peroxide solution, 0.2 part by weight of ethylene diamine tetraacetic acid and sufficient caustic soda to raise the pH to 11.5. 2.00 parts by weight of benzoyl chloride were finely dispersed in the solution in the manner described in Example III, additional caustic soda being added to maintain the pH at 11.5, and the temperature being maintained at 60° F. The agitation was slowed so as merely to maintain the solids, including a benzoyl peroxide suspension (10 to 50 microns particle size), in suspension and the mixture was held in this condition for 100 minutes. The mixture was then filtered and the separated unreacted benzoyl peroxide returned to the next batch. The filtrate was acidified to a pH of not more than about 2 and filtered, and the cake comprising perbenzoic acid was washed with water and dried.

The overall conversion of benzoyl chloride to perbenzoic acid was 70%.

The perbenzoic acid produced by the process of this invention, especially as illustrated by the above examples, is useful as a bleaching agent.

What is claimed is:

1. A process for the manufacture of perbenzoic acids which comprises the steps of:

(1) Forming, by violent agitation and distribution, a suspension of finely divided benzoyl peroxide selected from the group consisting of chlorobenzoyl peroxide, dichlorobenzoyl peroxide, alkyl-substituted benzoyl peroxide having from one to about four carbon atoms in the alkyl group, alkoxy-substituted benzoyl peroxide having from one to about four carbon atoms in the alkoxy group, and cyano-benzoyl peroxide in an aqueous alkaline solution of hydrogen peroxide containing at least 10% by weight excess hydrogen peroxide over that amount of hydrogen peroxide theoretically necessary to give 100% conversion of the benzoyl peroxides to perbenzoic acids and having a pH of not less than 10, said benzoyl peroxide having a particle size of from about 10 to about 50 microns; said suspension being stabilized against decomposition of the per compounds by the inclusion of a stabilizer selected from the group consisting of magnesium hydroxide, the sodium salts of ethylene-diamine-tetraacetic acid and the sodium salts of nitrilotriacetic acid;

(2) maintaining said suspension at a pH of not less than 10 and a temperature between the freezing point of the aqueous solution and about 75° F. until a part of said benzoyl peroxide is converted to a salt of the perbenzoic acid;

(3) separating the unconverted benzoyl peroxide from the aqueous solution containing the salt of the perbenzoic acid;

(4) precipitating perbenzoic acid by rapid acidification of the aqueous solution to a pH of not more than about 2; and (5) separating and recovering said perbenzoic acid.

2. The process of claim 1 wherein said benzoyl peroxide is meta-chloro benzoyl peroxide.

References Cited by the Examiner

UNITED STATES PATENTS 3,235,584   2/1966   Blumbergs _____ 260—502

OTHER REFERENCES

Brooks et al.: J. Am. Chem. Soc., 55, 4309–11 (1933).
Moyer et al.: J. Org. Chem., 29 (1964), 2098–2100.
Price et al.: Organic Synthesis, 23 (1943), 65–7.
Swern: Chem. Rev., 45 (1949), 11–16.
Swain et al.: J.A.C.S., 72 (1950), 5426–34.

LORRAINE A. WEINBERGER, *Primary Examiner.*
MARY B. WEBSTER, *Assistant Examiner.*